United States Patent [19]

Kawanami

[11] Patent Number: 6,085,044
[45] Date of Patent: *Jul. 4, 2000

[54] DRIVING CONTROL DEVICE, OPTICAL APPARATUS AND DRIVING CONTROL METHOD

[75] Inventor: Akihiro Kawanami, Tokyo, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/829,414

[22] Filed: Mar. 31, 1997

[30] Foreign Application Priority Data

Apr. 11, 1996 [JP] Japan ................................ 8-114153

[51] Int. Cl.[7] .............................. G03B 3/10; G03B 13/34
[52] U.S. Cl. .......................... 396/134; 396/135; 359/696
[58] Field of Search ................................ 396/134, 135; 359/696

[56] References Cited

U.S. PATENT DOCUMENTS

| | | | |
|---|---|---|---|
| 4,745,425 | 5/1988 | Kusaka | 396/135 |
| 5,008,605 | 4/1991 | Ohara et al. | 396/134 |
| 5,077,571 | 12/1991 | Takayama et al. | 396/134 |
| 5,724,194 | 3/1998 | Ishikawa | 396/696 |

*Primary Examiner*—Russell E. Adams
*Attorney, Agent, or Firm*—Robin, Blecker & Daley

[57] ABSTRACT

A driving control device includes a driving direction storing part for storing a driving direction of a driven body, a position detecting circuit for detecting a position of the driven body, and an amount-of-driving varying part for, when a direction of the present driving of the driven body differs from a direction of the last driving of the driven body stored in the driving direction storing part, varying an amount of driving of the driven body according to the position of the driven body detected by the position detecting circuit.

24 Claims, 9 Drawing Sheets

FIG. 2B
ENLARGED VIEW

| POSITION OF FOCUSING UNIT (OBJECT DISTANCE) | AMOUNT OF PLAY (IN TERMS OF PULSES) |
|---|---|
| 10m OR MORE | 10 PULSES |
| 5m TO LESS THAN 10m | 9 PULSES |
| 3m TO LESS THAN 5m | 8 PULSES |
| 2m TO LESS THAN 3m | 7 PULSES |
| LESS THAN 2m | 6 PULSES |

| POSITION OF FOCUSING UNIT (OBJECT DISTANCE) | AMOUNT OF PLAY (IN TERMS OF PULSES) | | |
|---|---|---|---|
| | FOCAL LENGTH | | |
| | 100mm | 200mm | 300mm |
| 10m OR MORE | 10 PULSES | 11 PULSES | 12 PULSES |
| 5m TO LESS THAN 10m | 9 PULSES | 10 PULSES | 11 PULSES |
| 3m TO LESS THAN 5m | 8 PULSES | 9 PULSES | 10 PULSES |
| 2m TO LESS THAN 3m | 7 PULSES | 8 PULSES | 9 PULSES |
| LESS THAN 2m | 6 PULSES | 7 PULSES | 8 PULSES |

DRIVING CONTROL DEVICE, OPTICAL APPARATUS AND DRIVING CONTROL METHOD

BACKGROUND OF THE INVENTION

1. Field of the Invention

This invention relates to a driving control device, an optical apparatus and a driving control method for accurately driving a driven body which is arranged to be driven by an actuator.

2. Description of Related Art

Picture taking apparatuses having an automatic focusing (AF) function, such as single-lens reflex cameras, video cameras, etc., and optical apparatuses and picture taking accessories, such as lenses and flash devices, have recently come to be provided with actuators, such as a DC motor, a stepping motor and a vibration wave motor. Their multi-functional and high-performance capabilities thus have advanced during recent years.

Generally, the internal mechanical arrangements of these equipments are caused to become complex by the actuators, reduction gears, cams, etc. Backlash in a gear train, play of fitting engagement and the like increase accordingly as the complexity of the internal mechanical arrangement increases. In the case of a camera having an automatic focusing mechanism, for example, the complexity of the mechanical arrangement causes deviations of focus and those of film transporting positions.

These problems may be made less serious to a certain extent by improving the precision of parts of the mechanical arrangement. It is, however, hardly possible to completely remove the play from a mechanical moving mechanism. Besides, an improvement in precision of parts causes an increase in manufacturing cost. Further, the adverse effect of the play of parts may be also lessened by including a mechanical canceling arrangement in the gear train. However, that arrangement still leaves problems unsolved with respect to an increase in cost and unevenness in precision of the parts.

To mitigate the adverse effect of the play of parts on the driving control for an actuator, it has been practiced to cancel the play by varying an amount of driving in driving a focusing unit of an automatic focusing lens, for example, if there is any possibility that the direction of the driving might be affected by mechanical play.

Figure 1:
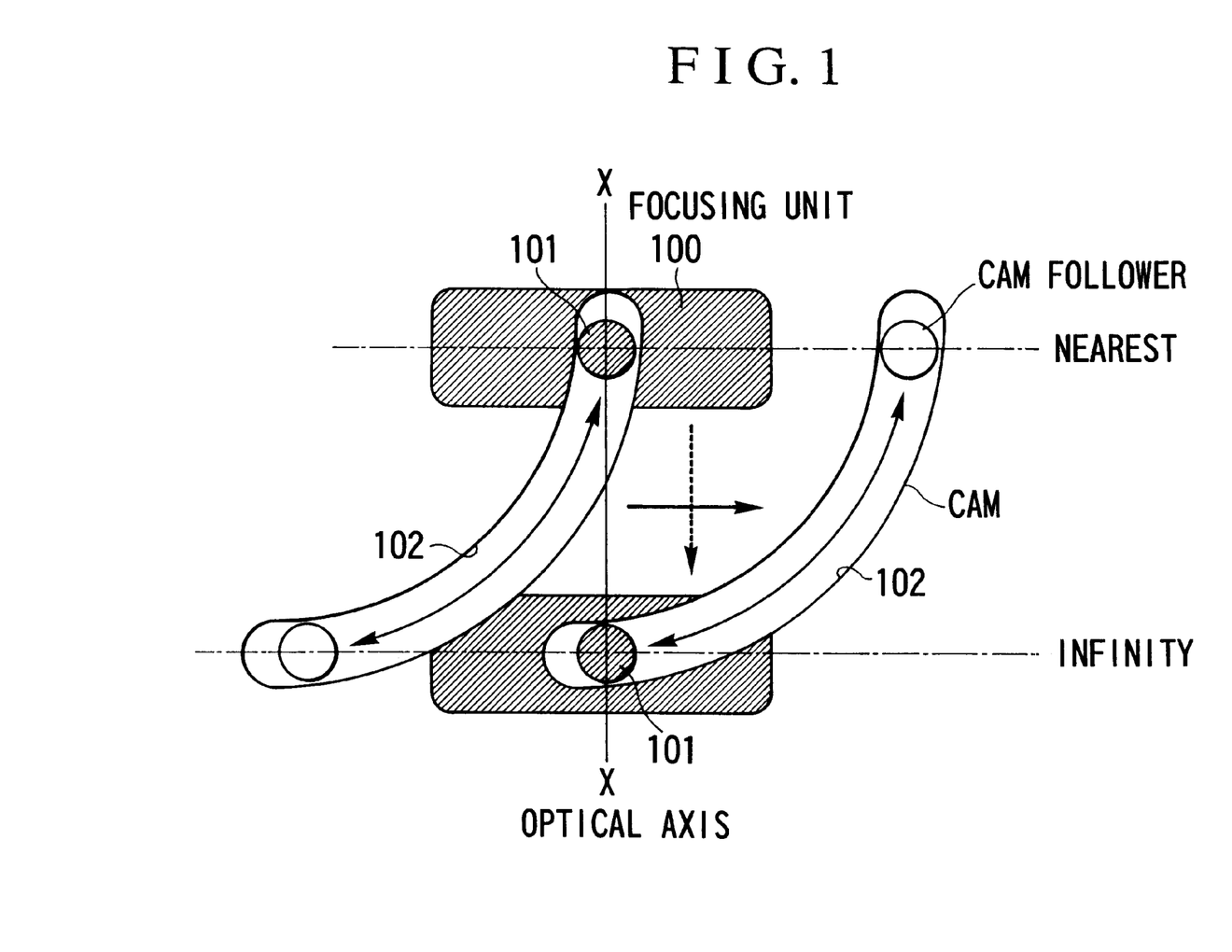
FIG. 1 is a diagram for explaining an operation of a focusing unit to be operated by a cam mechanism.

FIG. 1 shows the mechanism of operation of the conventional automatic focusing lens which is provided with a driving control device arranged in a system as mentioned above. Referring to FIG. 1, a focusing unit 100 is arranged to hold a focusing lens and to be movable in parallel to an optical axis X—X. The locus of the motion of the focusing unit 100 is defined jointly by a cam follower (roller) 101 which is fixed to the focusing unit 100 and a cam 102 which is arranged to revolve on the optical axis. When the cam follower 101 is at an upper part of the cam 102, as shown in FIG. 1, the focusing unit 100 is in a nearest distance position. When the cam 102 revolves in the direction of an arrow indicated by a full line, i.e., toward the right, the focusing unit 100 moves in the direction of an arrow indicated by a dotted line according to the shape of the cam 102.

Figure 2A:
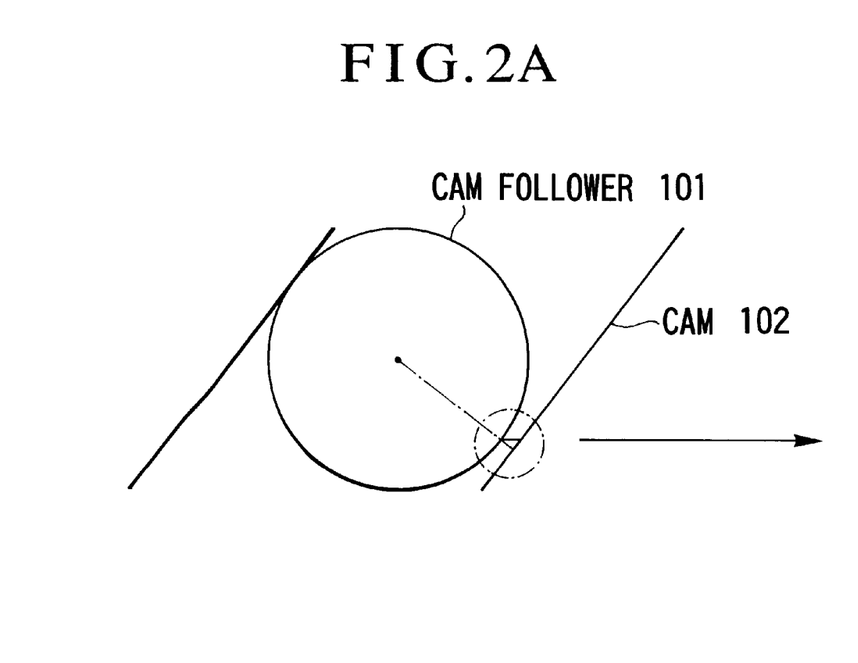
FIGS. 2A and 2B show the amount of play between a cam and a cam follower.
Figure 2B:
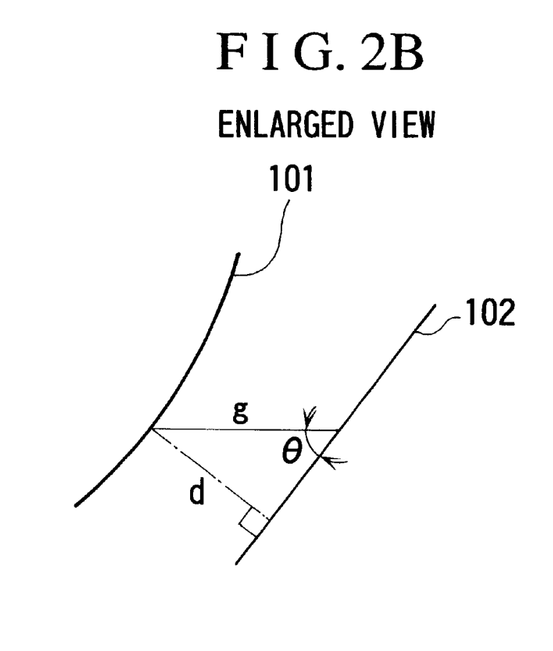

FIGS. 2A and 2B roughly show the relation of the cam follower 101 to the cam 102. Referring to FIG. 2A, since each of the cam 102 and the cam follower 101 is a moving member, it is inevitable to have some mechanical play between them. When the cam 102 revolves, the cam follower 101 moves in a state of being pulled into contact with one side face of the cam 102 due to the play. In a case where the cam 102 is to be moved in a direction reverse to the direction in which the cam 102 has been last moved, even if the cam 102 begins moving, the cam follower 101 cannot be moved instantly until a distance of play is crossed, as shown in FIG. 2B, which is an enlarged view of FIG. 2A.

Figure 3A:
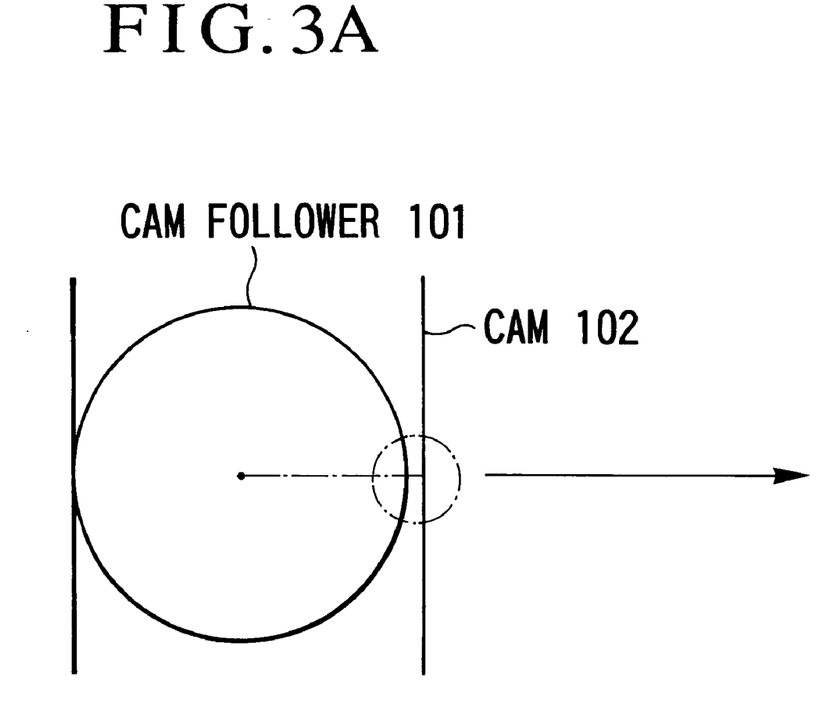
FIGS. 3A and 3B show also the amount of play between the cam and the cam follower.
Figure 3B:
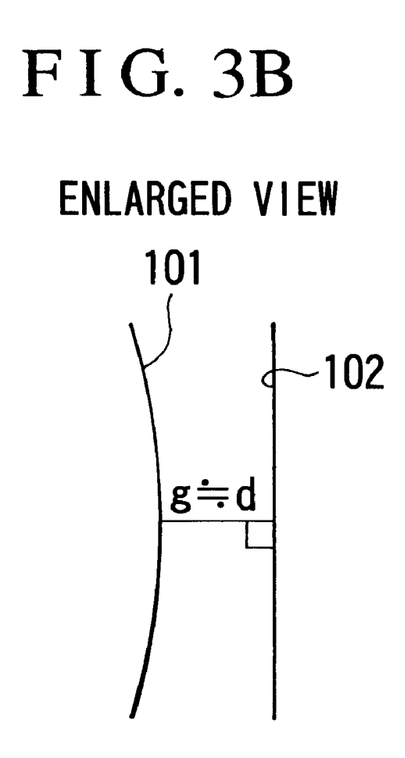

The amount of play "g" between the cam 102 and the cam follower 101 is then computed and obtained from the mechanical play "d" of fitting engagement and the inclination $\sin \theta$ of the cam 102. Thus, the amount of play "g" is obtained by the computing formula of "g=d/sin θ". As shown in FIGS. 3A and 3B, the inclination $\sin \theta$ of the cam 102 included in this formula causes the amount of play "g" to vary to give a relation of "g≧d" when the inclination $\sin \theta$ is close to 90 degrees.

The relation between the cam 102 and the cam follower 101 is close to a state shown in FIGS. 2A and 2B when the focusing unit 100 is located at an infinity distance position shown in FIG. 1, and is close to a state shown in FIGS. 3A and 3B when the focusing unit 100 is located at the nearest distance position shown in FIG. 1. In other words, the amount of play "g" between the cam 102 and the cam follower 101 varies with the position of the focusing unit 100 in the direction of the optical axis.

Reduction in size and enhancement in performance of the apparatuses using the driving control devices of the above-stated kind are expected to be furthered in the future. The above-stated complexity of the internal mechanical arrangement of parts is thus expected to be also furthered to diversify the state and the amount of play resulting from backlash and play. The arrangement of the convention driving control device described above is considered to be hardly capable of adequately coping with this trend because it leaves the amount of play in a fixed state.

BRIEF SUMMARY OF THE INVENTION

This invention is directed to the solution of the problem described above. It is, therefore, an object of this invention to provide a driving control device, an optical apparatus and a driving control method each of which is capable of accurately controlling a driving action on a driven body.

To attain the above object, a driving control device arranged according to this invention comprises driving direction storing means for storing a driving direction of a driven body, position detecting means for detecting a position of the driven body, and amount-of-driving varying means for, when a direction of the present driving of the driven body differs from a direction of the last driving of the driven body stored in the driving direction storing means, varying an amount of driving of the driven body according to the position of the driven body detected by the position detecting means.

Further, an optical apparatus according to this invention comprises driving direction storing means for storing a driving direction of a lens unit, position detecting means for detecting a position of the lens unit, and amount-of-driving varying means for, when a direction of the present driving of the lens unit differs from a direction of the last driving of the lens unit stored in the driving direction storing means, varying an amount of driving of the lens unit according to the position of the lens unit detected by the position detecting means.

Further, a driving control method according to this invention comprises a step of detecting a position of a driven body, and a step of, when a direction of the present driving of the driven body differs from a direction of the last driving of the driven body, varying an amount of driving of the driven body according to the position of the driven body.

The practical applications of this invention will become apparent from the following detailed description thereof.

DETAILED DESCRIPTION OF THE INVENTION

Preferred embodiments of this invention are described below with reference to the drawings.

(First Embodiment)

Figure 4:
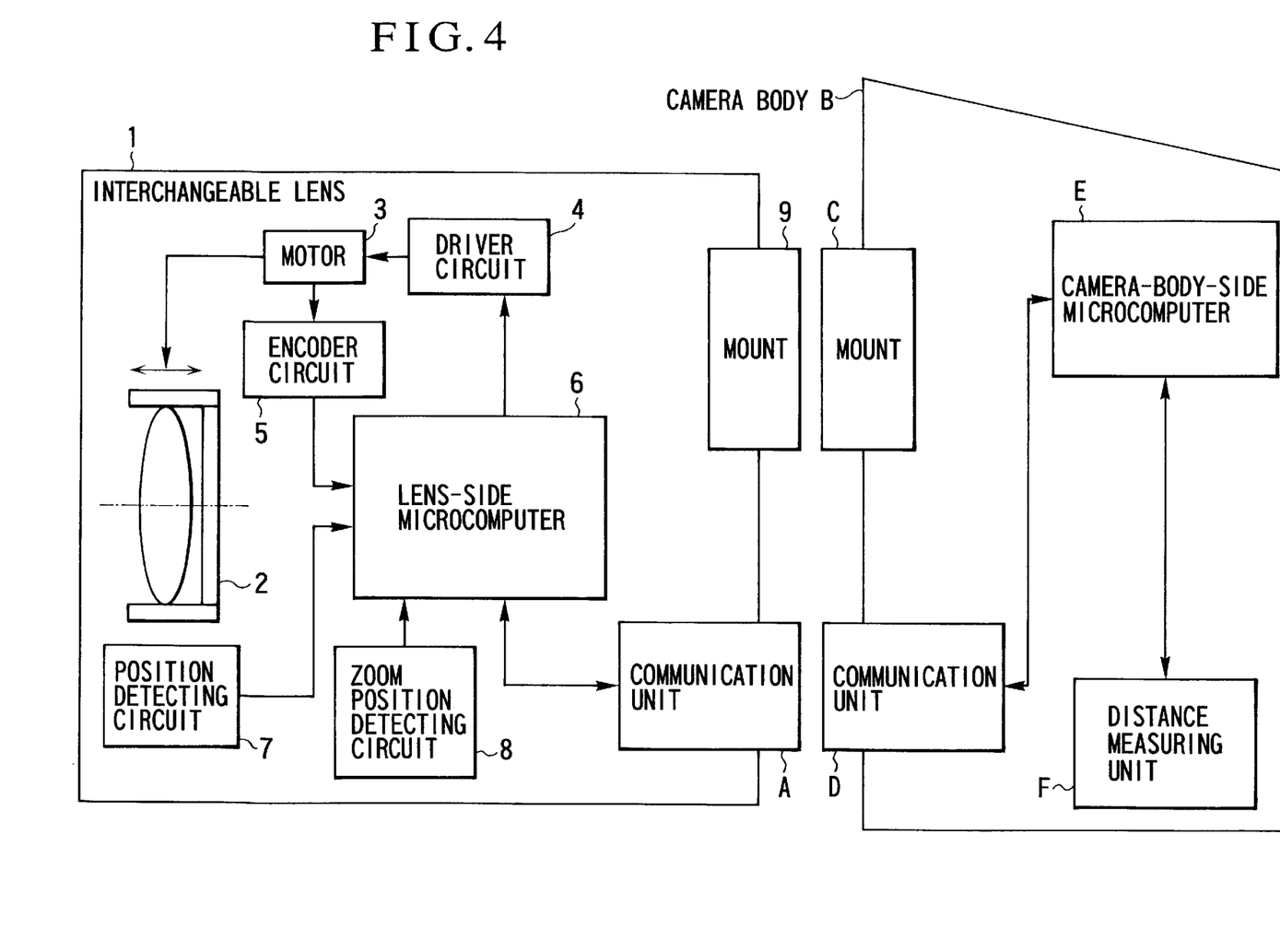
FIG. 4 is a block diagram showing an electrical system of an interchangeable lens which is adapted for an AF single-lens reflex camera and arranged according to this invention as a first embodiment thereof.

FIG. 4 shows in a block diagram an electrical system of an interchangeable lens of an AF single-lens reflex camera arranged in accordance with this invention as a first embodiment thereof. Referring to FIG. 4, the interchangeable lens 1 is of the type having a built-in actuator therein. A focusing unit 2 is an optical system for focusing, which serves as a driven body. A motor 3 is a driving means for driving the focusing unit 2 to effect focusing. A driver circuit 4 is arranged to turn on and off the motor 3 and also to change a speed of driving the focusing unit 2 from one speed over to another by varying an input to the motor 3. An encoder circuit 5 is arranged to read the speed of driving and the amount of driving of the focusing unit 2 with the motor 3. A lens-side microcomputer 6 is arranged to preside all control actions on the interchangeable lens 1 and includes therein a means for storing a driving direction and a means for storing constants. A position detecting circuit 7 is arranged as an absolute position detecting means to detect the position of the focusing unit 2. A zoom position detecting circuit 8 is arranged to detect a zoom position obtained when a magnification varying lens is moved. A mechanical mount 9 is provided on the lens side for mounting the interchangeable lens 1 on a camera body B. A communication unit A on the lens side is provided with a plurality of electric contacts for communication with a camera-body-side microcomputer E disposed in the camera body B. The camera body B is regarded as an optical apparatus. A mechanical mount C is arranged on the side of the camera body B to be coupled with the lens-side mount 9. A communication unit D on the side of the camera body B is provided with a plurality of electric contacts for communication with the lens-side microcomputer 6. The camera-body-side microcomputer E is arranged to preside over all control actions of the camera body B. A distance measuring unit F is arranged to measure a distance to an object to be photographed.

Referring to FIG. 4, when the interchangeable lens 1 is mounted on the camera body B through the lens-side mount 9 and the camera-body-side mount C, the camera-body-side microcomputer E makes a request for optical data to the lens-side microcomputer 6 through the communication unit D on the side of the camera body B and the communication unit A on the side of the lens 1. In response to the request, the lens-side microcomputer 6 sends to the camera-body-side microcomputer E the optical data requested by the camera-body-side microcomputer E.

The camera-body-side microcomputer E then stores at an internal memory the optical data of various kinds received from the lens-side microcomputer 6. At the same time, the camera-body-side microcomputer E computes an amount of driving of the focusing unit 2 of the interchangeable lens 1 on the basis of focusing sensitivity data included in the optical data received and an output of the distance measuring unit F. Information on the computed amount of driving of the focusing unit 2 is sent to the lens-side microcomputer 6 through the camera-body-side communication unit D and the lens-side communication unit A.

Upon receipt of information on the amount of driving, the lens-side microcomputer 6 determines a driving direction of the focusing unit 2 according to the positive or negative sign of the amount of driving. In a case where the focusing unit 2 is to be driven in a direction reverse to the direction in which the focusing unit has been driven last time, the absolute position of the focusing unit 2 is obtained from the output of the position detecting circuit 7. Then, an amount of play "g" (backlash) in the absolute position of the focusing unit 2 is either computed or derived from the internal memory. The amount of play "g" thus derived and the amount of driving sent from the camera-body-side microcomputer E are added together to obtain a new amount of driving of the focusing unit 2. The new amount of driving is transmitted to the motor 3 through the driver circuit 4 so as to start driving the focusing unit 2.

With the motor 3 driven, the encoder circuit 5 outputs a pulse waveform synchronized with the rotational frequency of the motor 3. The lens-side microcomputer 6 then derives the driving speed and the actual amount of driving amount of the focusing unit 2 from the output of the encoder circuit 5.

While the focusing unit 2 is driven, the lens-side microcomputer 6 compares the actual amount of driving with a newly computed amount of driving. If the actual amount of driving is found to be equal to or larger than the newly computed amount of driving, the lens-side microcomputer 6 immediately stops the motor 3 through the driver circuit 4 so as to stop driving the focusing unit 2.

Figure 5:
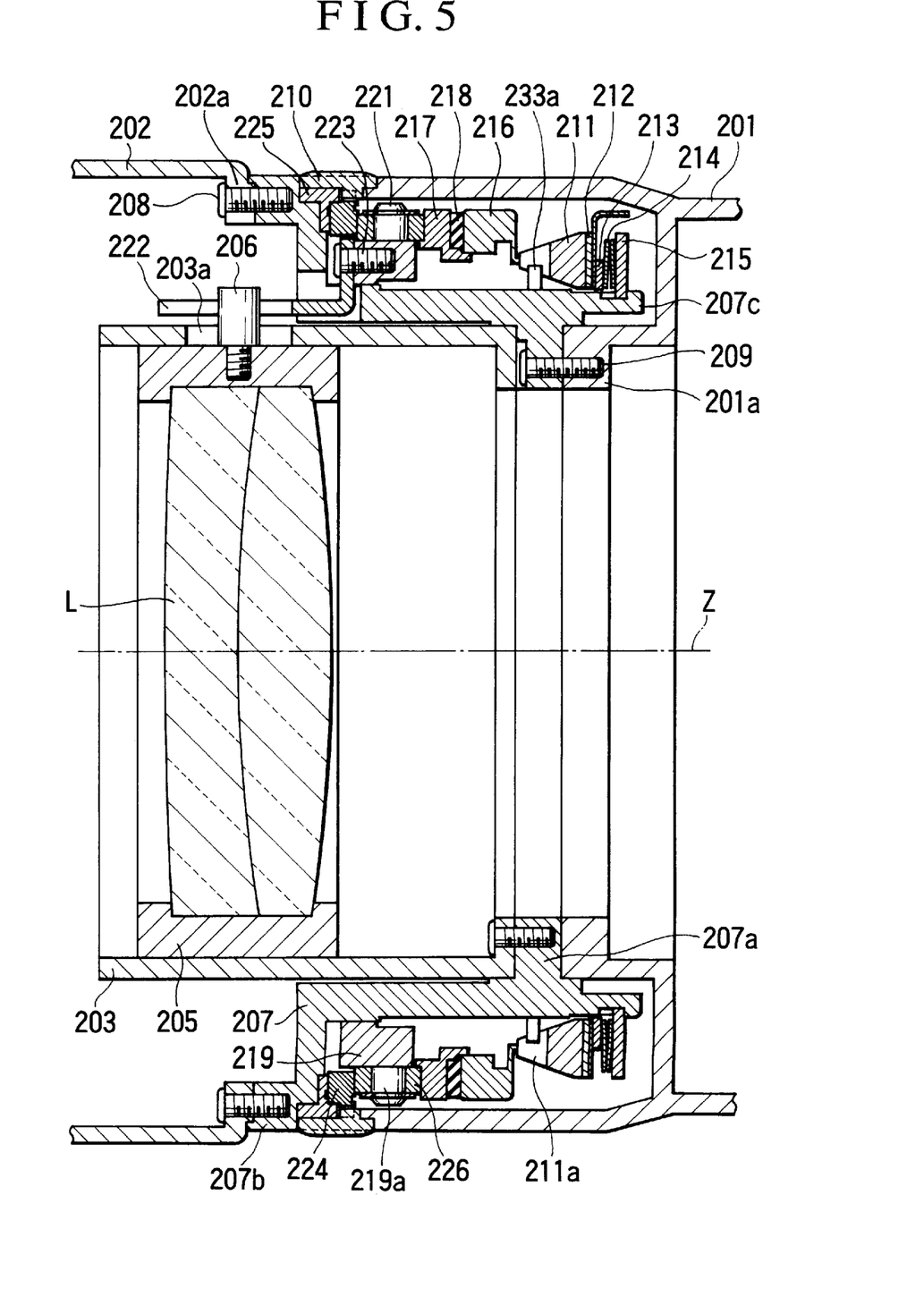
FIG. 5 is a longitudinal sectional view showing the mechanical arrangement of the interchangeable lens of the first embodiment of this invention.

FIG. 5 shows the mechanical arrangement of the interchangeable lens 1. The electrical system shown in FIG. 4 is omitted from the following description of the mechanical arrangement shown in FIG. 5. Referring to FIG. 5, the interchangeable lens 1 includes a fixed tube 201, a shell tube 202, a cam tube 203, and a lens holder 205 which is fitted into the inner diametral part of the cam tube 203. A cam follower 206 is fitted into a cam slot 203a of the cam tube 203 and is secured to an upper part of the lens holder 205. A lens element L is secured to the lens holder 205.

A tubular body 207 which serves as a frame or a base plate for a vibration wave motor device has an outward facing flange 207b tightly fixed to an inward facing flange 202a of the shell tube 202 with screws 208. To an inward facing flange 207a of the tubular body 207 is fixed an inward facing flange 201a of the fixed tube 201 with screws 209. The tubular body 207 is thus secured to the fixed tube 201. A manual operation ring 210 is fitted in a circumferential groove formed on the outer circumferential side of the fixed tube 201 and also fitted on the outer circumferential side of a manual collar 225. The manual operation ring 210 is thus arranged to be rotatable on the axis Z, i.e., an optical axis, of the lens element L. All component parts of the vibration wave motor device are mounted on the outer circumferential surface of the tubular body 207.

The vibration wave motor device is configured as follows. The vibration wave motor device includes a ring-like vibration member 211 which has a trapezoid sectional shape and acts as an elastic stator, an electrostrictive element 212 which is physically connected to one end face of the vibration member 211, a ring-shaped vibration absorbing body 213 which is made of felt or the like and is pressed against the surface of the electrostrictive element 212, a ring-shaped belleville spring 214 which is arranged to push the vibration absorbing body 213 toward the vibration member 211, a ring-shaped holding member 215 which is arranged to hold the pushing force of the belleville spring 214 between the tubular body 207 and a fixing member 207c connected to the tubular body 207, a ring-shaped circumferential moving member 216 which is arranged as a rotor of the oscillatory wave motor device, a rotary tube 217 which is arranged to be rotatable integrally with the circumferential moving member 216, a rubber ring 218 which is tightly fitted in between the rotary tube 217 and the circumferential moving member 216 and is arranged to prevent the axial motion, i.e., chatter vibrations, of the circumferential moving member 216 from being transmitted to the rotary tube 217, and a vibration member whirl stop 233a which is arranged to stop the vibration member 211 from rotating itself.

The vibration wave motor device is arranged to cause the circumferential moving member 216, the rotary tube 217 and the rubber ring 218 to integrally rotate on the optical axis Z by means of circumferential traveling wave vibrations generated at the vibration member 211 by the electromechanical converting action of the electrostrictive element 212.

The ring-shaped manual collar 225 which is secured to the tubular body 207 is used as a frictional force stabilizing member. The manual operation ring 210 is rotatably fitted on the manual collar 225 in such a way as to give a good operation feeling when the manual operation ring 210 is operated. Meanwhile, a manual operation input ring 224 is in contact with the outer circumferential face of a roller 226 at its one end face and is in contact with the end face of the manual collar 225 at its other end face.

The outer circumferential edge part of the manual operation input ring 224 is engaging a recessed part provided in the manual operation ring 210 on the inner circumferential side of the ring 210 and is thus arranged to rotate integrally with the ring 210. Further, the manual operation input ring 224 is arranged to be rotatable only when a driving torque which is greater than a frictional resistance between the manual operation input ring 224 and the manual collar 225 is transmitted from the manual operation ring 210. The manual operation input ring 224, therefore, cannot be caused to rotate unless the manual operation ring 210 is operated by the operator of the interchangeable lens 1 to rotate it at a rotating torque overcoming the frictional resistance between the manual operation input ring 224 and the manual collar 225.

The operation of the above-stated arrangement is next described. In manually driving the lens holder 205, the operator of the interchangeable lens 1 operates the manual operation ring 210 with fingers to cause it to rotate on the optical axis Z. The manual operation input ring 224 then rotates on the optical axis Z by overcoming the frictional resistance between it and the manual collar 225. In this instance, the vibration wave motor device is not driven. The rotary tube 217 of the vibration wave motor device is thus kept stationary by a frictional force between the vibration member 211 and the circumferential moving member 216. Therefore, the roller 226 is caused by the manual operation input ring 224 to roll along the side face of the rotary tube 217 while rotating on a roller supporting shaft 219a.

As a result, a ring 219 is caused to rotate on the optical axis Z through the roller supporting shaft 219a. Therefore, a lens holder driving member 222 which engages the cam follower 206 causes the lens holder 205 to axially move along the cam slot 203a of the cam tube 203 while rotating on the optical axis Z. A manual focusing operation is carried out in the above manner.

Figure 6:
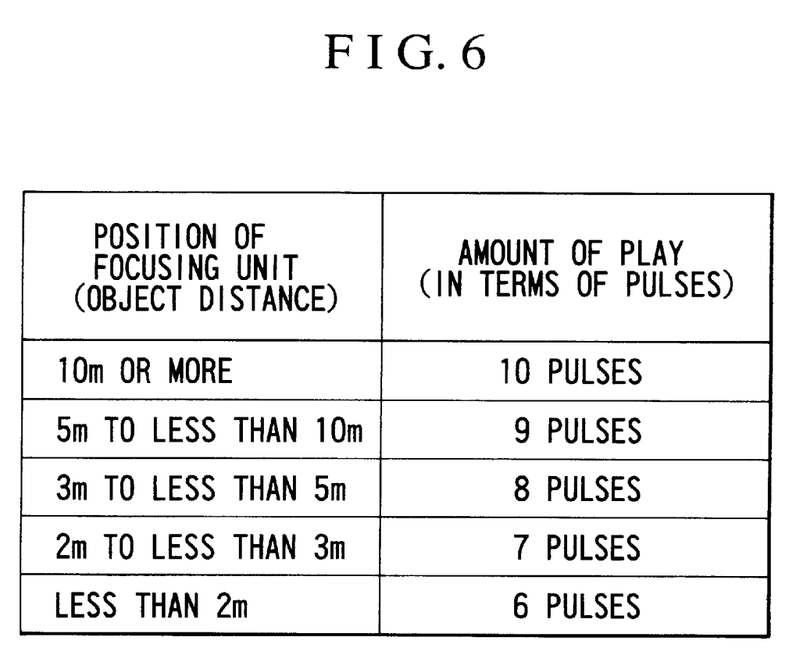
FIG. 6 is a data table showing amounts of play in the first embodiment of this invention.

FIG. 6 shows by way of example a data table stored at the internal memory of the microcomputer. The data table is prepared by computing amounts of play "g" taking place at respective various absolute positions of the focusing unit 2 when the motion of the focusing unit 2 is reversed and by arranging constants corresponding to the respective computed amounts of play "g".

As shown in FIG. 6, in the data table, the stored amount of play "g" which is to be added at the time of reversing of the moving direction of the focusing unit 2, in terms of instruction pulses, is 10 pulses when the focusing unit 2 is in a focusing position for an object distance of 10 m or more, 9 pulses for an object distance of 5 m to less than 10 m, 8 pulses for an object distance of 3 m to less than 5 m, 7 pulses for an object distance of 2 m to less than 3 m, and 6 pulses for an object distance of less than 2 m.

Figure 7:
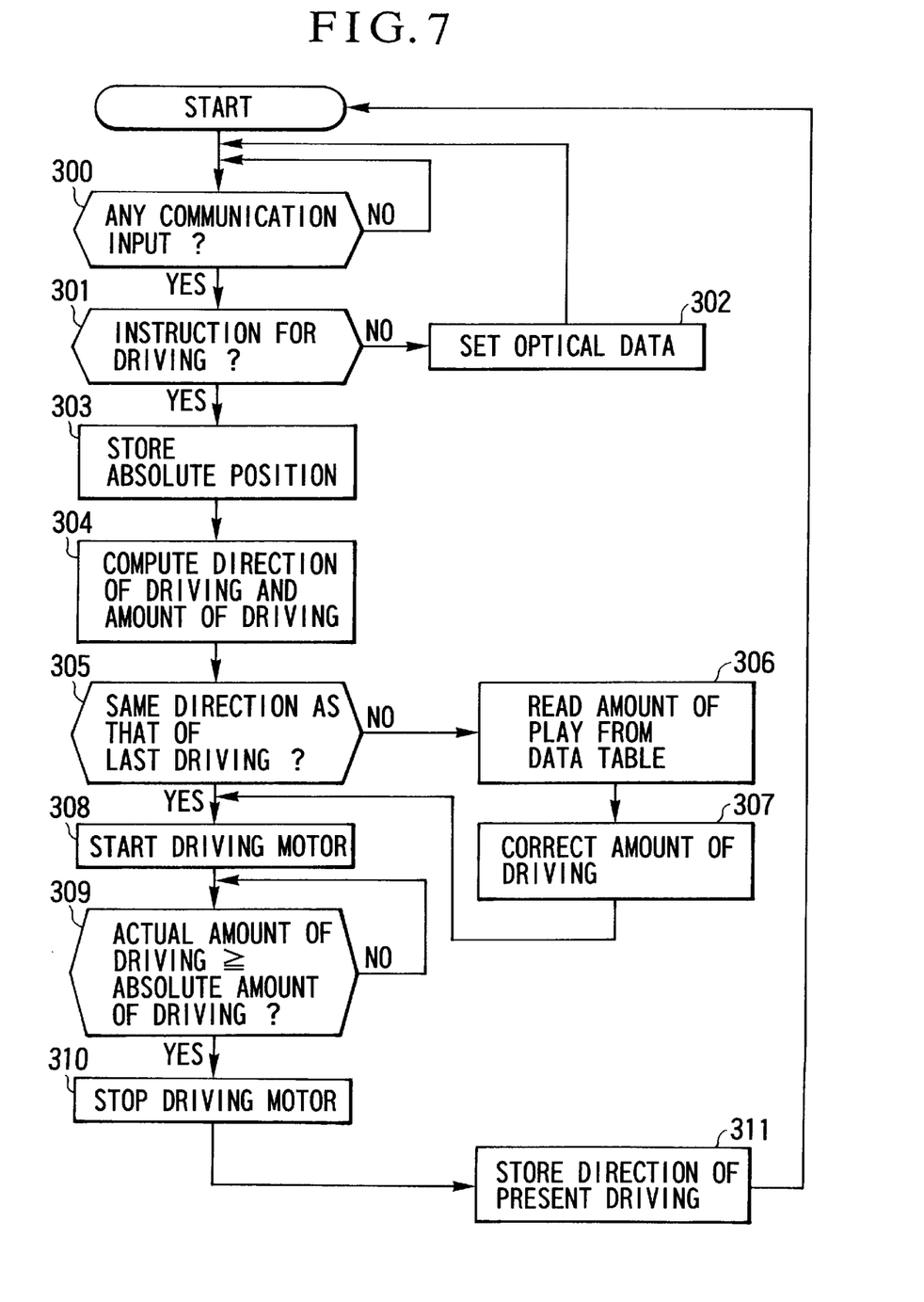
FIG. 7 is a flow chart showing an operation of the first embodiment of this invention.

FIG. 7 is a flow chart showing an operation of the first embodiment. Referring to FIG. 7, at a step 300, the lens-side microcomputer 6 makes a check to find if a communication input is received from the camera-body-side microcomputer E through the communication unit A. If so, the flow of operation proceeds to a step 301. At the step 301, the lens-side microcomputer 6 checks the data of the input to make a discrimination between an instruction for driving the focusing unit 2 and an instruction for sending optical data. If the input is found to be the instruction for sending optical data, the flow proceeds to a step 302 to transfer the data requested by the camera-body-side microcomputer E to a storage buffer provided inside the lens-side microcomputer 6 for transmission. The flow then returns to the step 300 to wait for a communication input again. The optical data transferred to the storage buffer is sent to the camera-body-side microcomputer E the instant a next communication input is received.

If the communication input from the camera-body-side microcomputer E is found at the step 301 to be an instruction for driving the focusing unit 2, the flow proceeds to a step 303. At the step 303, the lens-side microcomputer 6 detects the present absolute position of the focusing unit 2 by obtaining an output of the position detecting circuit 7 and transferring it to a memory. The lens-side microcomputer 6 waits for a next communication input. At a step 304, since data of the next communication input indicates the amount of driving and the direction of driving of the focusing unit 2, the data is taken in.

Then, the absolute amount of driving and the direction of driving of the focusing unit 2 is transferred to an analyzing memory.

At a step 305, the present driving direction is compared with the last driving direction. If the present driving direction is found to be reverse to the last driving direction, the flow proceeds to a step 306. At the step 306, an amount of play "g" is read out from the data table on the basis of the present position of the focusing unit 2 which is beforehand transferred to the memory, and the flow proceeds to a step 307. At the step 307, the amount of play "g" read out is added to the amount of driving transmitted from the camera-body-side microcomputer E.

The amount of driving of the focusing unit 2 is thus corrected, and an amount of driving stored at the internal memory is updated accordingly.

The first embodiment is arranged, as mentioned above, to have amounts of play "g" for absolute positions of the focusing unit 2 computed and stored as the data table beforehand in the lens-side microcomputer 6. However, in a case where the storage capacity of the memory is limited, the arrangement may be changed to correct the amount of driving each time by utilizing the computing formula mentioned in the foregoing.

At the next step 308, the lens-side microcomputer 6 instructs the driver circuit 4 to begin driving the motor 3. The instant the motor 3 begins to be driven, a pulse output synchronized with the rotational frequency of the motor 3 is inputted from the encoder circuit 5 to a counter disposed inside the lens-side microcomputer 6. The count value of the counter corresponds to the amount of driving by which the focusing unit 2 is actually moved.

At a step 309, the lens-side microcomputer 6 compares the actual amount of driving with the amount of driving stored beforehand at the memory. If the actual amount of driving is found to be larger than the stored amount of driving, the flow proceeds to a step 310 to bring the motor 3 to a stop through the driver circuit 4. At a step 311, the present driving direction of the focusing unit 2 is stored at the internal memory of the lens-side microcomputer 6. The flow then returns to the step of waiting for a communication input from the camera-body-side microcomputer E.

(Second Embodiment)

The function of the zoom position detecting circuit 8 shown in FIG. 4 has been omitted from the description of the first embodiment. The zoom position detecting circuit 8 relates to a magnification varying function. In the case of a second embodiment of this invention, the magnification varying function is added to give a more elaborate control system.

Figure 8:
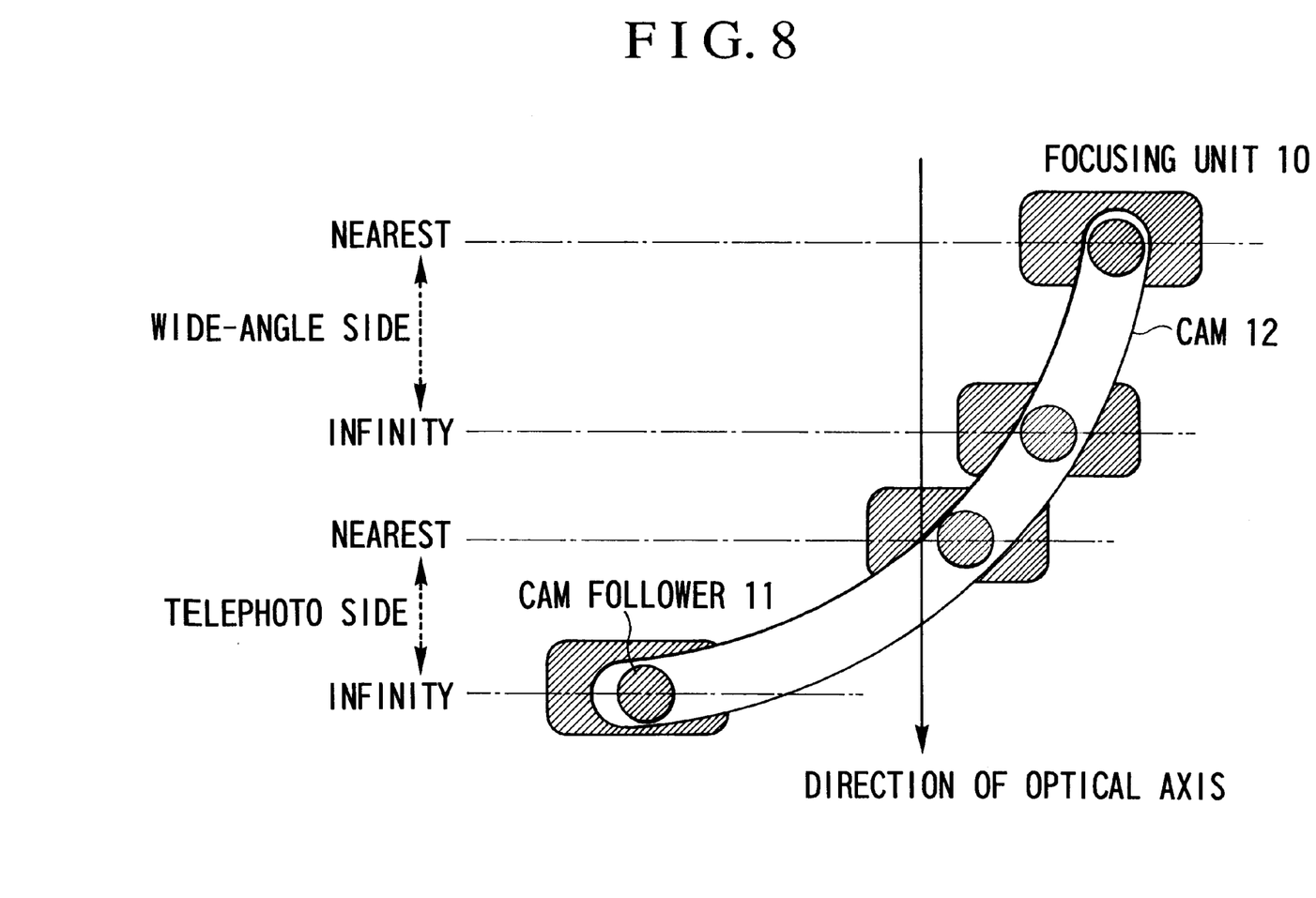
FIG. 8 is a diagram for explaining an operation of a focusing unit to be operated by a cam mechanism of an AF lens in a second embodiment of this invention.

FIG. 8 is a diagram for explaining the second embodiment showing that the position of a focusing unit 10 is varied by the magnification varying function. In other words, the sensitivity of focusing delicately changes according to the position of the focusing unit 10. FIG. 8 shows the operating mechanism of the lens arranged to mechanically correct the amount of the delicate change to keep the sensitivity of focusing constant. In this case, both a change of the sensitivity of focusing caused by the magnification varying function and a change of the sensitivity of focusing caused by the focusing function can be corrected by means of a single cam 12. The circumferential moving face of a cam follower 11 which moves over the cam 12 is arranged to be changed from one face over to another according to the magnification varying (zooming) position of the lens. Then, the circumferential moving face of the cam follower 11 also changes to follow the change-over. For simplification of illustration, FIG. 8 shows the focusing unit 10 as if it is movable also perpendicular to the direction of the optical axis. In actuality, however, the rotative motions of the cam follower 11 and the cam 12 relative to each other allow the focusing unit 10 to move only in the direction of the optical axis.

The cam 12 is arranged to be rotated by the magnification varying function and the focusing range of the focusing unit 10 is defined also by the magnification varying function. Referring to FIG. 8, the inclination of the cam 12 obtained on a telephoto side differs from the inclination of the cam 12 obtained on a wide-angle side. This difference clearly indicates that the amount of play "g" of the focusing unit 10 is caused to vary also by the magnification varying function.

Figure 9:
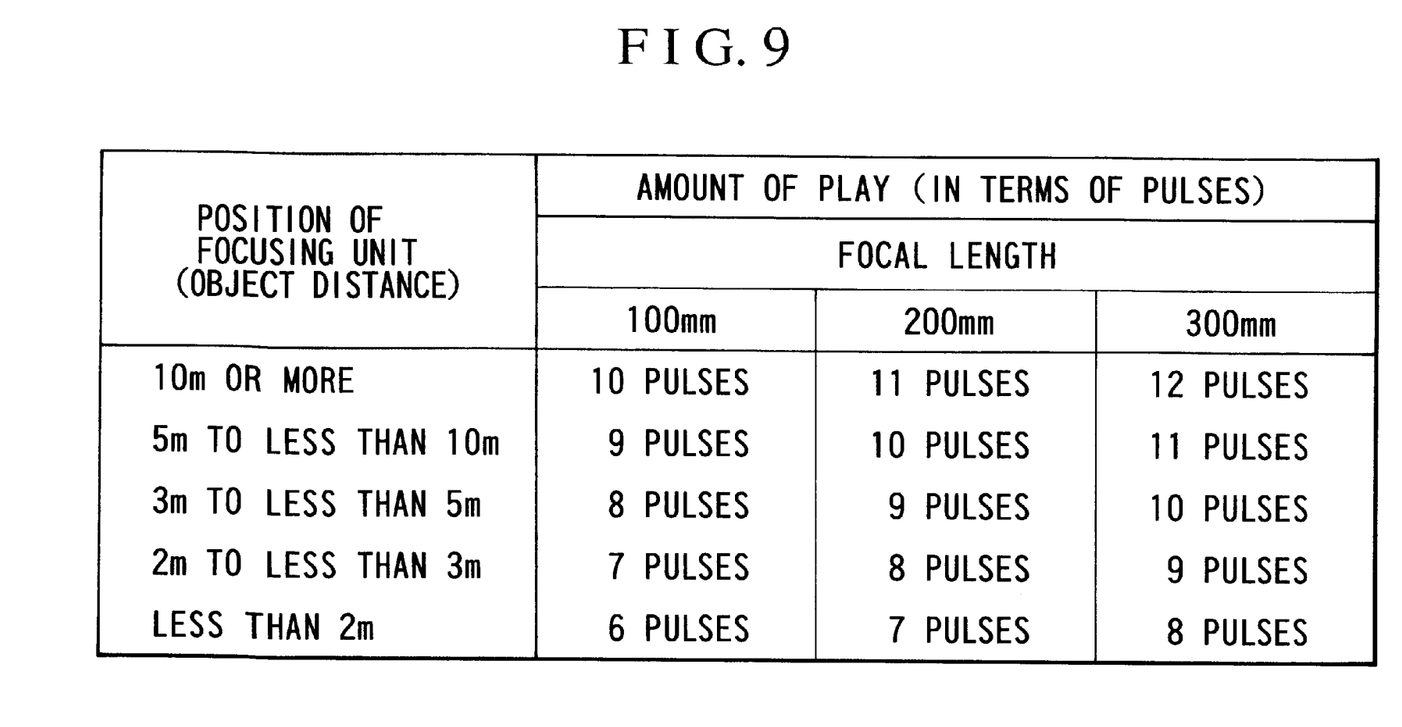
FIG. 9 is a data table showing amounts of play in the second embodiment of this invention.

FIG. 9 shows by way of example a data table stored at the internal memory of the microcomputer. The data table is prepared by computing amounts of play "g" which vary with the respective focusing positions and the respective zooming positions (focal lengths) and by arranging constants corresponding to the respective amounts of play "g" in the data table.

As shown in FIG. 9, at a focal length of 100 mm, the stored amount of play "g" which is to be added at the time of reversing of the moving direction of the focusing unit 10, in terms of instruction pulses, is 10 pulses when the focusing unit 2 is in a focusing position for an object distance of 10 m or more, 9 pulses for an object distance of 5 m to less than 10 m, 8 pulses for an object distance of 3 m to less than 5 m, 7 pulses for an object distance of 2 m to less than 3 m, and 6 pulses for an object distance of less than 2 m.

At a focal length of 200 mm, the stored amount of play "g" is 11 pulses when the focusing unit 10 is in the focusing position for the object distance of 10 m or more, 10 pulses for the object distance of 5 m to less than 10 m, 9 pulses for the object distance of 3 m to less than 5 m, 8 pulses for the object distance of 2 m to less than 3 m, and 7 pulses for the object distance of less than 2 m.

At a focal length of 300 mm, the stored amount of play "g" is 12 pulses when the focusing unit 10 is in the focusing position for the object distance of 10 m or more, 11 pulses for the object distance of 5 m to less than 10 m, 10 pulses for the object distance of 3 m to less than 5 m, 9 pulses for the object distance of 2 m to less than 3 m, and 8 pulses for the object distance of less than 2 m.

In the case of the data table shown in FIG. 9, the amounts of play "g" are divided into three groups for different focal lengths. However, the control can be more elaborately carried out by increasing the number of divisions. Further, the bulky amount of data to be processed can be reduced by changing the method of storing the data table to a method of having the inclination of the cam recognized as a function and an amount of play "g" computed at the lens-side microcomputer 6.

In the second embodiment, the arrangement of the interchangeable lens of the AF single-lens reflex camera is the same as that of the first embodiment shown in FIG. 4. The operation of the second embodiment is also the same as that of the first embodiment shown in FIG. 7, with the exception that the zooming position is detected and then the amount of play "g" taking place at each of zooming positions is computed and stored in the data table. The same arrangement and the same operation as those of the first embodiment are, therefore, omitted from the above description of the second embodiment to avoid duplicate description.

According to the embodiments described above, in a case where the direction in which a driven body is actually driven differs from the direction stored in a driving direction storing means, the absolute position of the driven body is detected and the amount of driving of the driven body is corrected by varying the amount of play taking place in reversing the driving direction of the driven body on the basis of the absolute position detected. Therefore, the accuracy of control over the position of the driven body is greatly enhanced.

In the cases of the embodiments described above, this invention is applied to the driving control for the lens. However, this invention is applicable also to the driving control to be carried out, for example, in transporting a film and winding a magnetic tape by means of actuators.

I claim:

1. A driving control device comprising:
   driving direction storing means for storing a driving direction of a driven body;
   position detecting means for detecting a position of said driven body; and
   amount-of-driving varying means for, when a direction of the present driving of said driven body differs from a direction of the last driving of said driven body stored in said driving direction storing means, varying an amount of driving of said driven body according to the position of said driven body detected by said position detecting means.

2. A driving control device according to claim 1, further comprising varied value storing means for storing a varied value of the amount of driving obtained according to the position of said driven body.

3. A driving control device according to claim 1, further comprising second position detecting means for detecting a position of a movable body other than said driven body, and
   wherein said amount-of-driving varying means varies the amount of driving of said driven body according to the position of said movable body detected by said second position detecting means.

4. A driving control device according to claim 3, further comprising varied value storing means for storing a varied value of the amount of driving obtained according to the positions of said driven body and said movable body.

5. A driving control device according to claim 1, wherein said driven body includes a lens unit.

6. A driving control device according to claim 3, wherein said driven body includes a focusing lens unit, and said movable body includes a magnification varying lens unit.

7. An optical apparatus comprising:
   driving direction storing means for storing a driving direction of a lens unit;
   position detecting means for detecting a position of said lens unit; and
   amount-of-driving varying means for, when a direction of the present driving of said lens unit differs from a direction of the last driving of said lens unit stored in said driving direction storing means, varying an amount of driving of said lens unit according to the position of said lens unit detected by said position detecting means.

8. An optical apparatus according to claim 7, further comprising varied value storing means for storing a varied value of the amount of driving obtained according to the position of said lens unit.

9. An optical apparatus according to claim 7, further comprising second position detecting means for detecting a position of a second lens unit other than said first-mentioned lens unit, and
   wherein said amount-of-driving varying means varies the amount of driving of said first-mentioned lens unit according to the position of said second lens unit detected by said second position detecting means.

10. An optical apparatus according to claim 9, further comprising varied value storing means for storing a varied value of the amount of driving obtained according to the positions of said first-mentioned lens unit and said second lens unit.

11. An optical apparatus according to claim 9, wherein said first-mentioned lens unit includes a focusing lens unit, and said second lens unit includes a magnification varying lens unit.

12. A driving device comprising:
    a drive mechanism for moving a body in a direction or in a reverse direction along an axis;
    position detecting means for detecting a position of the body relative to the axial direction;
    direction detecting means for detecting a direction of movement of the body when the body is moved by the driving mechanism; and
    a control device for controlling said driving mechanism, said control device comparing a direction of previous movement of the body detected by the direction detecting means with a direction of movement in which the body is to be moved, and controlling the driving mechanism by using a correction value when the compared directions are different and controlling the drive mechanism without using the correction value when the compared directions are the same, said correction value being determined according to a present position of the body detected by the position detecting means.

13. An optical appliance comprising:
    a lens unit;
    a drive mechanism to moving a body in a direction or in a reverse direction along an axis;
    position detecting means for detecting a position of the body relative to the axial direction;
    direction detecting means for detecting a direction of movement said lens unit moved by the drive mechanism; and
    a control device for controlling said driving mechanism, said control device comparing a direction of previous movement of the lens unit detected by the direction detecting means with a direction of movement in which the lens unit is to be moved, and controlling the driving mechanism by using a correction value when the compared directions are different and controlling the drive mechanism without using the correction value when the compared directions are the same, said correction value being determined according to a present position of the lens unit detected by the position detecting means.

14. A driving control device comprising:
    means for detecting a driving direction of a driven body;
    driving means for driving said driven body;
    detecting means for detecting a position of said driven body as driven by said driving means; and
    control means for controlling said driving means according to the position of said driven body detected by said detecting means and a next driving direction and a past driving direction detected by said detecting means.

15. An optical apparatus comprising:
    means for detecting a driving direction of a lens unit;
    driving means for driving said lens unit;
    detecting means for detecting a position of said lens unit as driven by said driving means; and
    control means for controlling said driving means according to the position of said lens unit detected by said detecting means and a next driving direction and a past driving direction detected by said detecting means.

16. A driving device comprising:
a driving mechanism for moving a body in a direction or in a reverse direction along an axis, said mechanism having a play which varies in amount at plural positions of the body relative to the axial direction;
position detecting means for detecting a position of the body relative to the axial direction;
direction detecting means for detecting a direction of movement of the body moved by the driving mechanism; and
a control device for controlling the driving mechanism, said control device storing a correction value corresponding to an amount of the play at each of the plural positions, comparing a direction of a precedent movement of the body detected by the direction detecting means with a direction in which the body is to be moved, and controlling the driving mechanism by using the correction value corresponding to a present position of the body detected by the position detecting means when the compared directions are different and controlling the drive mechanism without using the correction value when the compared directions are the same.

17. An optical appliance comprising:
a lens unit;
a driving mechanism for moving the lens unit in a direction or in a reverse direction along an axis, said mechanism having a play which varies in amount at plural positions of the lens unit relative to the axial direction;
position detecting means for detecting a position of the lens unit relative to the axial direction;
direction detecting means for detecting a direction of movement of the lens unit moved by the driving mechanism; and
a control device for controlling the driving mechanism, said control device storing a correction value corresponding to an amount of the play at each of the plural positions, comparing a direction of a precedent movement of the lens unit detected by the direction detecting means with a direction in which the lens unit is to be moved, and controlling the driving mechanism by using the correction value corresponding to a present position of the lens unit detected by the position detecting means when the compared directions are different and controlling the drive mechanism without using the correction value when the compared directions are the same.

18. A lens driving device for driving a lens in an optical axial direction through a cam mechanism which is arranged to have a play when a direction of a previous driving of the lens is different from a direction of a present driving of the lens, the driving amount of the present driving of the lens being corrected by the amount corresponding to the play, comprising:
memory means for memorizing the amount corresponding to the play for plural mutually different positions of the lens,
detection means for detecting a present position of the lens, wherein the amount corresponding to the play for the present driving is obtained by using the memory means and the detection means;
direction detecting means for detecting a direction of movement of the lens moved by the driving mechanism; and
a control device for controlling the driving mechanism, said control device comparing a direction of a precedent movement of the lens detected by the direction detecting means with a direction in which the lens unit is to be moved, and controlling the driving mechanism by using the obtained amount of play when the compared directions are different and controlling the drive mechanism without using the obtained amount when the compared directions are the same.

19. A lens barrel having the lens driving device according to claim 18.

20. An image forming device having the lens driving device according to claim 18.

21. A drive device, comprising:
a body,
a driving mechanism for moving the body in a direction or in a reverse direction along an axis, said mechanism having a play which varies in amount at plural positions of the body;
position detecting means for detecting a position of the body relative to the axial direction;
direction detecting means for detecting a direction of movement of the body moved by the driving mechanism; and
a control device for controlling the driving mechanism, said control device storing a correction value corresponding to an amount of the play at each of the plural positions, comparing a direction of a precedent movement of the body detected by the direction detecting means with a direction in which the body is to be moved, and controlling the driving mechanism by using the correction value corresponding to a present position of the body detected by the position detecting means when the compared directions are different.

22. A drive device, comprising:
a lens unit;
a driving mechanism for moving the lens unit in a direction or in a reverse direction along an axis, said mechanism having a play which varies in amount at plural positions of the lens unit relative to the axial direction;
position detecting means for detecting a position of the lens unit relative to the axial direction;
direction detecting means for detecting a direction of movement of the lens unit moved by the driving mechanism; and
a control device for controlling the driving mechanism, said control device storing a correction value corresponding to an amount of the play at each of the plural positions, comparing a direction of a precedent movement of the lens unit detected by the direction detecting means with a direction in which the lens unit is to be moved, and controlling the driving mechanism by using the correction value corresponding to a present position of the lens unit detected by the position detecting means when the compared directions are different.

23. A drive device, comprising:
a driving mechanism for moving a body in a direction or in a reverse direction along an axis;
position detecting means for detecting a position of the body relative to the axial direction;
direction detecting means for detecting a direction of movement of the body moved by the driving mechanism; and a control device for controlling the driving mechanism, said control device comparing a direction of a precedent movement of the body detected by the direction detecting means with a direction in which the body is to be moved, and determining a correction value to be used for the controlling of the driving mechanism according to the position of the body detected by the position detecting means when the compared directions are different.

24. An optical appliance, comprising:

a lens unit;

a driving mechanism for moving the lens unit in a direction or in a reverse direction along an optical axis;

position detecting means for detecting a position of the body relative to the optical axis direction;

direction detecting means for detecting a direction of movement of the lens unit moved by the driving mechanism; and a control device for controlling the driving mechanism, said control device comparing a direction of a precedent movement of the lens unit detected by the direction detecting means with a direction in which the lens unit is to be moved, and determining a correction value to be used for the controlling of the driving mechanism according to the position of the lens unit detected by the position detecting means when the compared directions are different.

* * * * *